(12) United States Patent
Rasmussen

(10) Patent No.: US 10,551,102 B2
(45) Date of Patent: Feb. 4, 2020

(54) BULB FOR A THERMOSTATIC EXPANSION VALVE, SET COMPRISING A BULB AND AT LEAST A PART OF A THERMOSTATIC EXPANSION VALVE CONNECTED TO A CAPILLARY AND METHOD FOR CONNECTING A BULB AND A CAPILLARY OF A THERMOSTATIC EXPANSION VALVE

(71) Applicant: DANFOSS A/S, Nordborg (DK)

(72) Inventor: Jens Erik Rasmussen, Gråsten (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/543,268

(22) PCT Filed: Jan. 5, 2016

(86) PCT No.: PCT/EP2016/050063
§ 371 (c)(1),
(2) Date: Jul. 13, 2017

(87) PCT Pub. No.: WO2016/120024
PCT Pub. Date: Aug. 4, 2016

(65) Prior Publication Data
US 2018/0003420 A1    Jan. 4, 2018

(30) Foreign Application Priority Data
Jan. 26, 2015   (EP) ..................................... 15152509

(51) Int. Cl.
*F25B 41/06*       (2006.01)
*G01K 5/32*        (2006.01)
(52) U.S. Cl.
CPC ............ *F25B 41/067* (2013.01); *G01K 5/326* (2013.01); *F25B 2341/062* (2013.01); *F25B 2500/06* (2013.01)

(58) Field of Classification Search
CPC .............. F25B 41/062; F25B 2341/068; F25B 2341/063; F25B 41/067; F25B 2700/21; F25B 2341/062; G01K 5/326
See application file for complete search history.

(56) References Cited

U.S. PATENT DOCUMENTS

| 23,706 A | 4/1859 | Race et al. |
| 853,505 A | 5/1907 | Eddy |
| (Continued) | | |

FOREIGN PATENT DOCUMENTS

| CN | 2199555 Y | 5/1995 |
| CN | 104078275 A | 10/2014 |
| DE | 196 47 718 A1 | 5/1998 |

OTHER PUBLICATIONS

International Search Report for PCT Serial No. PCT/EP2016/050063 dated Mar. 2, 2016.

*Primary Examiner* — Kun Kai Ma
(74) *Attorney, Agent, or Firm* — McCormick, Paulding & Huber PLLC

(57) ABSTRACT

A bulb (5) for a thermostatic expansion valve is provided, said bulb (5) comprising a chamber (7), said chamber (7) being located within a metallic casing of said bulb and being filled with a filling adapted to influence a valve element of said thermostatic expansion valve. Service of a temperature controlled valve connected to a bulb should be facilitated. To this end said bulb (5) comprises a connection geometry (10) adapted to be connected to a capillary member (6) and said casing being provided with a closed opening zone located within said connection geometry (10), said opening zone being adapted to be opened upon mounting a counterpart (15) to said connection geometry (10).

21 Claims, 2 Drawing Sheets

(56) References Cited

U.S. PATENT DOCUMENTS

| | | | | |
|---|---|---|---|---|
| 1,771,194 A | * | 7/1930 | Schlaich | G01K 5/326 428/34.1 |
| 1,815,567 A | * | 7/1931 | Lawrence | G01K 5/326 428/34.1 |
| 1,902,784 A | * | 3/1933 | Larkin | F25B 41/062 374/148 |
| 1,978,362 A | * | 10/1934 | Fonseca | G05D 23/128 236/15 A |
| 1,979,109 A | | 10/1934 | Johnsson | |
| 1,985,733 A | * | 12/1934 | Koester | G01K 5/326 428/486 |
| 2,008,663 A | | 7/1935 | Dillman | |
| 2,069,727 A | * | 2/1937 | Spencer | F23Q 9/12 219/137 R |
| 2,116,802 A | * | 5/1938 | Shivers | F25B 41/062 236/92 B |
| 2,221,633 A | * | 11/1940 | Dasher | F25B 41/062 236/92 B |
| 2,231,163 A | * | 2/1941 | Johnson | F25B 41/062 137/505.42 |
| 2,242,334 A | | 5/1941 | Wile | |
| 2,287,784 A | * | 6/1942 | Cunningham | G05D 23/12 200/81.8 |
| 2,303,011 A | * | 11/1942 | Weber | G05D 23/128 137/553 |
| 2,355,043 A | | 8/1944 | Adlam | |
| 2,385,243 A | * | 9/1945 | Wiegers | F25B 5/02 236/1 R |
| 2,452,441 A | * | 10/1948 | Dube | F25B 41/062 137/599.01 |
| 2,519,483 A | | 8/1950 | Lange | |
| 2,520,386 A | * | 8/1950 | Dillman | F23R 3/20 137/468 |
| 2,573,151 A | * | 10/1951 | Lange | F25B 41/062 236/92 B |
| 2,577,902 A | * | 12/1951 | McGrath | F25B 41/062 236/99 D |
| 2,577,903 A | * | 12/1951 | McGrath | F25B 41/062 236/99 D |
| 2,702,723 A | * | 2/1955 | MacDougall | F25B 41/062 236/92 B |
| 2,780,413 A | * | 2/1957 | Jensen | G05D 23/138 137/85 |
| 2,901,578 A | * | 8/1959 | Noakes | H01H 37/20 337/310 |
| 3,078,878 A | * | 2/1963 | Emmons | G01K 5/326 138/46 |
| 3,119,176 A | | 1/1964 | Buesseler et al. | |
| 3,144,206 A | * | 8/1964 | Seiffert | G05D 23/126 236/99 G |
| 3,337,179 A | | 8/1967 | Genbauffe | |
| 3,459,044 A | * | 8/1969 | Zurstadt | G01K 5/326 374/203 |
| 3,587,642 A | | 6/1971 | Gotzenberger | |
| 3,726,141 A | * | 4/1973 | Bremer | G01K 11/04 374/202 |
| 3,766,783 A | * | 10/1973 | Tortoso | G01K 5/326 374/159 |
| 3,780,787 A | * | 12/1973 | Rasmussen | B22C 9/04 164/213 |
| 4,979,372 A | * | 12/1990 | Tanaka | F25B 41/062 236/92 B |
| 5,044,551 A | * | 9/1991 | Tanaka | F25B 41/062 236/92 B |
| 5,706,853 A | * | 1/1998 | Rønnow | F25B 41/062 137/495 |
| 8,313,040 B2 | * | 11/2012 | Okutsu | F25B 41/062 236/92 B |
| 2003/0189139 A1 | * | 10/2003 | Rasmussen | F16L 3/137 248/68.1 |
| 2005/0235692 A1 | * | 10/2005 | Nungesser | F25B 41/062 62/527 |
| 2006/0182164 A1 | * | 8/2006 | Hart | F25B 41/062 374/141 |
| 2010/0011791 A1 | | 1/2010 | Strickland et al. | |

* cited by examiner

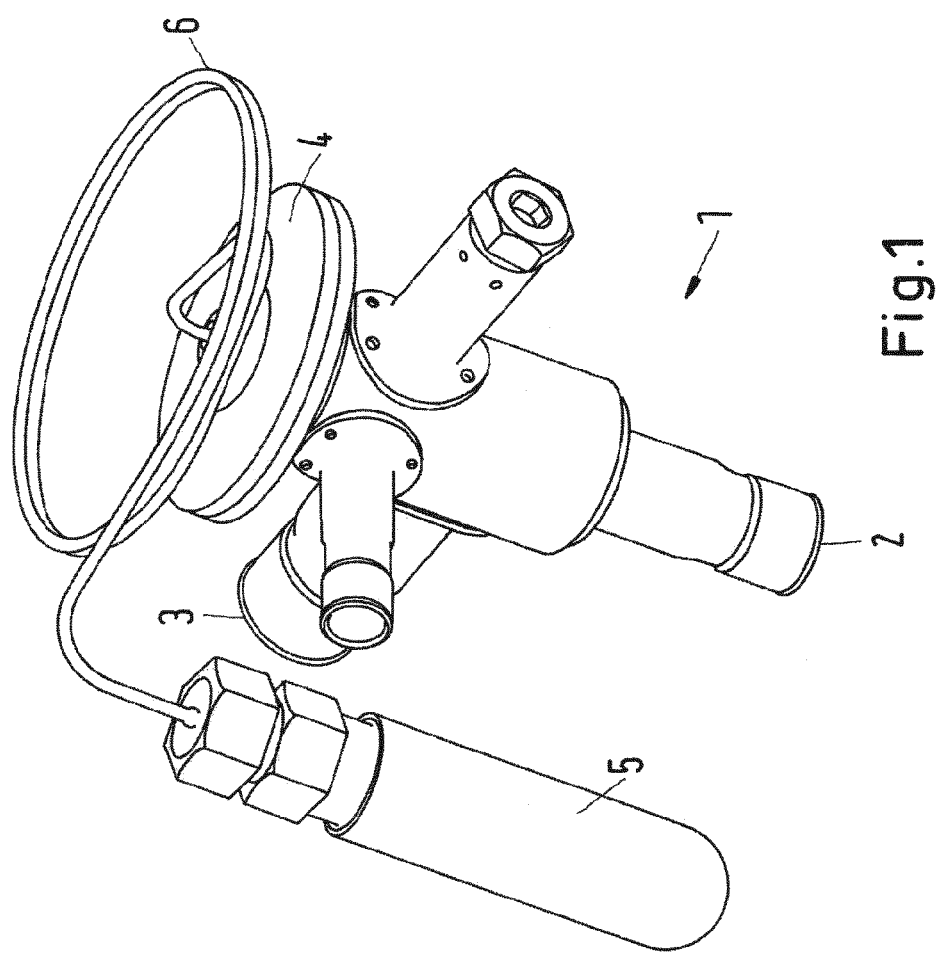

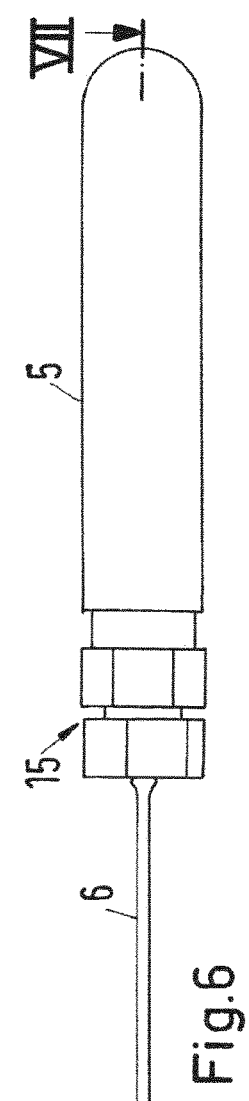
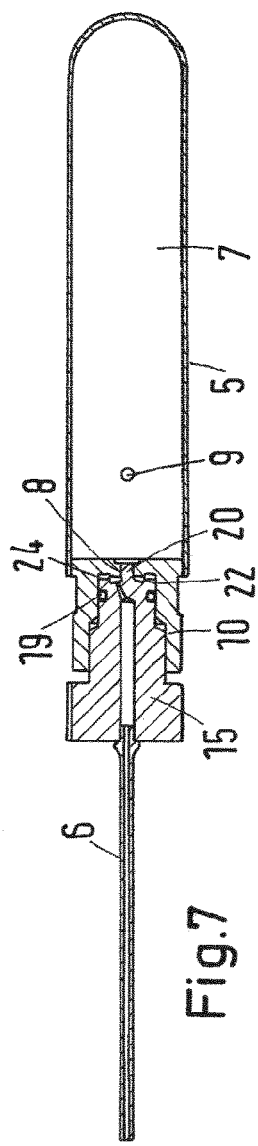
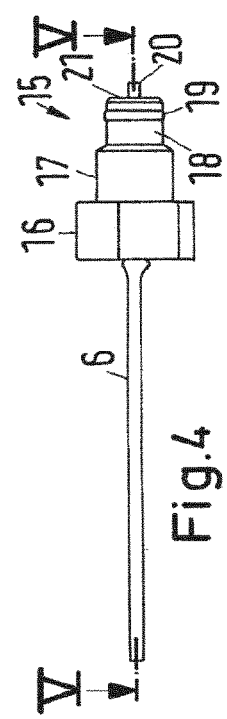
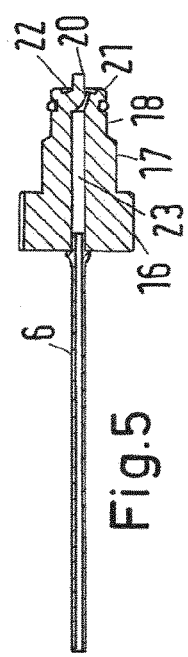

BULB FOR A THERMOSTATIC EXPANSION VALVE, SET COMPRISING A BULB AND AT LEAST A PART OF A THERMOSTATIC EXPANSION VALVE CONNECTED TO A CAPILLARY AND METHOD FOR CONNECTING A BULB AND A CAPILLARY OF A THERMOSTATIC EXPANSION VALVE

CROSS-REFERENCE TO RELATED APPLICATIONS

This application is a National Stage application of International Patent Application No. PCT/EP2016/050063, filed on Jan. 5, 2016, which claims priority to European Patent Application No. 15152509.4, filed on Jan. 26, 2015, each of which is hereby incorporated by reference in its entirety.

TECHNICAL FIELD

The present invention relates to a bulb for a thermostatic expansion valve, said bulb comprising a chamber, said chamber being located within a metallic casing of said bulb and being filled with a filling adapted to influence a valve element of said thermostatic expansion valve.

Furthermore, the present invention relates to a set comprising such a bulb and at least a part of a thermostatic expansion valve connected to a capillary.

Finally the present invention relates to a method for connecting a bulb and a capillary of a thermostatic expansion valve.

BACKGROUND

A refrigerant circuit usually comprises a compressor, a condenser, an expansion valve and an evaporator. The expansion valve controls the flow of refrigerant from the condenser into the evaporator. This flow is controlled according to a demand of cooling power. This demand is detected by means of the bulb. The bulb comprises a chamber filled with a filling adapted to influence a valve element of said thermostatic expansion valve. When the temperature increases the pressure of this filling increases as well. A capillary connects the bulb to the thermostatic expansion valve so that the pressure of the filling propagates through the capillary towards the thermostatic expansion valve to influence the opening degree. When the temperature around the bulb decreases the pressure of the filling decreases as well and the thermostatic expansion valve is actuated in the opposite direction.

When such a thermostatic expansion valve shows a defect, the service people often have to replace it. This replacement requires that the service people have a suitable spare part with them. This requirement makes the service complicated since there is a large variety of different bulbs, one for each specific application. It is difficult for the service people to have all different types of combinations of bulbs and valve with them in their car.

SUMMARY

The object underlying the invention is to provide service of a thermostatic expansion valve with low costs.

This object is solved with a bulb as described at the outset in that said bulb comprises a connection geometry adapted to be connected to a capillary member and said casing being provided with a closed opening zone located within said connection geometry, said opening zone being adapted to be opened upon mounting a counterpart to said connection geometry.

In this way it is possible to avoid the requirement to have a large variety of different combinations of valve and bulbs. It is possible to have a large number of different bulbs and only one or few valve parts. The bulbs and the valve part can be combined as necessary during service or repair. Therefore, the costs and volume for spare parts can be dramatically reduced. Since the chamber is closed by a closed opening zone of the metallic casing, the bulb can be prefilled in the factory with the filling. During the connection of the bulb and the capillary an opening is produced in said opening zone to establish a connection between the chamber and the capillary.

Preferably said opening zone comprises an opening closed by a closing member held in said opening, in particular by a press fit. The closing member seals the chamber to the outside as long as the opening zone is closed. As soon as the counterpart is fixed to the connection geometry, the closing member is pressed out of the opening thereby establishing a communication between the chamber and the capillary. The press fit is sufficient to establish a sealing when the bulb is not used, i.e. during transport and storage. However, when the bulb is connected to the capillary, the closing member can be pushed out of the opening so that a connection between the chamber and the capillary is established. Preferably said closing member is in a form of a ball. A ball (which can also be named "sphere") can be used with different orientations with respect to the bulb and the opening without changing its characteristics. It is therefore sufficient to have an opening with a circular cross section and to have a closing member having a diameter which is slightly larger than the diameter of the opening to establish a press fit when the ball is pressed into the opening after the filling has been introduced into the chamber.

Preferably said opening has an area adapted to a size of the closing member allowing said closing member to be pushed into said space. The simplest form of the opening therefore is a hollow cylinder having a constant diameter and holding the closing member. When the bulb and the capillary are connected, the closing member is pushed into the chamber during the connecting step.

Preferably said opening is positioned centrally with respect to said connection geometry. In this way it is possible to use a counterpart which is to be connected with the connection geometry to push the closing member out of the opening into the chamber, irrespective of the orientation of the counterpart relative to the connecting geometry. In particular when the capillary and the bulb are connected by screwing, a part of the counterpart can always act on the closing member to push it into the chamber.

In another preferred embodiment said opening zone is adapted to be perforated by a part of said counterpart. When the counterpart is fixed to the connection geometry, a part of the counterpart is able to penetrate the opening zone in order to establish a connection between the chamber and the capillary.

The object is solved with a set as described above and at least part of a thermostatic expansion valve connected to capillary, said capillary having at one end a counterpart to said connection geometry of said bulb.

In this way it is possible to connect the bulb and the respective part of the thermostatic expansion valve via the capillary at the service location. This means that the service people can assemble the combination of bulb and valve at the service location so that the costs for spare parts and the volume needed to take them in the car can be kept small.

In this case it is preferable that said counterpart comprises a pin at a front face, said pin being adapted to be pushed into said opening zone to produce said opening. When the counterpart and the connection geometry are connected to each other the pin is used to push the closing member out of the opening into the chamber or to penetrate the opening zone.

In this case it is preferred that said pin has a cross section smaller than said area of said opening. Even when the pin is inserted into the opening there is enough space around the pin to allow the heat expandable filling to escape out of the chamber into the capillary when temperature increases.

In a preferred embodiment said counterpart comprises a groove in said front face surrounding said pin and a channel connected to said groove. This groove forms a path for the heat expandable filling between the chamber and the capillary. The remaining part of the front face radially outside said groove can be used as sealing surface.

Preferably a metallic seal is arranged between said front face and said bulb. A metallic seal allows for a reliable seal which is in particular important when the heat expandable filling is not allowed to escape into the environment.

Furthermore, it is preferred that a ring seal is located on a circumferential face of said counterpart, said ring seal sealing against said connection geometry. When the counterpart is inserted into the connection geometry and the pin acts on the closing member to push the closing member into the chamber there is at a certain moment the situation that the chamber is open to the interior of the connection geometry and the metallic seal does not form a seal. In this situation the ring seal prevents an escape of the heat expandable filling to the outside. Furthermore, the ring seal has a second function. Once the connection between the counterpart and the connecting geometry has been established, the ring seal prevents that that moisture or other environmental disturbances reach the metallic seal. In this way corrosion can be prevented.

The object is solved by a method for connecting a bulb and a capillary of a thermostatic expansion valve having the following steps:

Selecting a bulb, said bulb having a chamber, said chamber being located within a metallic casing of said bulb and being filled with a filling adapted to influence a valve element of said thermostatic expansion valve, said bulb comprising a connection geometry, said casing comprising an opening zone within said connection geometry, in a connecting step connecting said connection geometry to a counterpart arranged at an end of said capillary, producing an opening in said opening zone, in particular by pressing a closing member out of an opening of said opening zone into said chamber or by perforating said opening zone upon moving said counterpart towards said chamber during said connecting step.

As already described above, such a method makes it possible to assemble the bulb and the valve part connected to the capillary at the service location. In this way it is possible to choose the required combination of bulb and valve part as needed without having the necessity to carry a large number of combinations of bulbs and valve with the service people.

In a preferred embodiment said counterpart is connected to said connecting geometry by screwing. Screwing is a reliable form of connection. Furthermore, when the counterpart and the connection geometry are rotated relative to each other to perform the screwing, the counterpart is moved into the connection geometry making is possible to push the closing member out of the opening into the chamber or to penetrate said opening zone.

Preferably a sealing is established by inserting said counterpart into said connecting geometry. This sealing can be made, for example, by a ring seal, as illustrated above.

In a preferred embodiment a metallic seal is positioned between a front face of said counterpart and said connecting geometry. This metallic seal prevents reliably escape of the heat expandable filling out of the chamber into the environment.

BRIEF DESCRIPTION OF THE DRAWINGS

A preferred embodiment of the invention will now be described in more detail with reference to the drawing, wherein:

FIG. 1 shows a perspective view of an expansion valve connected to a bulb via a capillary, FIG. 2 shows the bulb, FIG. 3 is a section III-III according to FIG. 2, FIG. 4 shows the capillary and a counterpart connected to the capillary, FIG. 5 shows a section V-V according to FIG. 4, FIG. 6 shows an assembly of bulb and capillary, and FIG. 7 shows a section VII-VII according to FIG. 6.

DETAILED DESCRIPTION

FIG. 1 shows an expansion valve 1 as it is used in a refrigerant circuit. Since the inner construction of this expansion valve is of minor interest for the present invention the expansion valve 1 is shown from the outside only.

The expansion valve 1 has an inlet 2 and an outlet 3. A throttling resistance of the expansion valve 1 can be adjusted with help of driving means 4 which are controlled by the superheat of the vapour coming out of the evaporator of the refrigerant circuit. The superheat is determined by pressure within the valve and by the temperature of the location of a bulb 5. The driving means 4 are connected to the bulb 5 via a capillary 6. This makes it possible to position the bulb 5 remote from the expansion valve 1 in a location the temperature of which is used for controlling the expansion valve 1.

FIGS. 2 and 3 show the bulb 5. The bulb 5 comprises a chamber 7 which is filled with a heat expandable filling. This heat expandable filling can be pure gas or it can be a two phase filling of liquid and gas. The heat expandable filling increases its pressure when temperature rises and decreases its pressure when temperature is lowered.

The chamber 7 is located in a metallic casing. In most cases the casing and the bulb 5 are identical. The casing is provided with an opening zone which has an opening 8. A closing member 9 is arranged in the opening 8 and held in the opening 8 by a press-fit. The closing member 9 is in form of a ball or sphere. The opening 8 is of cylindrical form, i.e. it has a constant diameter over its length. The diameter is slightly smaller than the diameter of the closing member 9 so that the closing member 9 can be pressed into the opening 8 and seals the opening 8 in the absence of other forces. The ball has been given a thin layer of tin to ensure tightness.

Furthermore, the bulb comprises a connection geometry 10 in form of a hexagon 11 at its circumferential surface to allow a tool to engage the connection geometry. The connection geometry furthermore has an inner thread 12 and a smooth section 13 between the inner thread 12 and the opening 8. The section 13 can have a smaller diameter than the inner thread 12. Therefore, a step 14 is shown between the inner thread 12 and the section 13. The opening 8 is located within the connection geometry 10. The part of the bulb 5 surrounded by the connection geometry 10 is briefly termed "opening zone" since it is adapted to be opened as will be described below.

In the form shown in FIGS. 2 and 3 the bulb 5 is produced in a factory, i.e. the chamber 7 is filled with the heat expandable filling and the opening 8 is closed by the closing member 9.

FIGS. 4 and 5 show the capillary 6. The capillary 6 has a counterpart 15 at one end. The counterpart 15 has a hexagon 16 to allow a tool to engage the counterpart 15. Furthermore, the counterpart 15 has an outer thread 17 adapted to the inner thread 12 of the connection geometry 10.

Furthermore, the counterpart 15 has a section 18 with a smaller diameter. A ring seal 19 is located at this section 18. The outer diameter of the section 18 is adapted to the inner diameter of section 13 of the connection geometry so that the ring seal 19 forms a seal between the connection geometry 10 and the counterpart 15 once the section 18 of the counterpart 15 has been inserted into section 13 of the connection geometry 10.

Furthermore, a pin 20 is provided at a front face 21 of the counterpart 15. This pin 20 has a length corresponding to the length of the opening 8. Furthermore, it has a diameter which is slightly smaller than the diameter of the opening 8.

A groove 22 in front face 21 surrounds pin 20. This groove 22 is connected to a channel 23 which forms a connection between the groove 22 and the interior of the capillary 6 as shown in FIGS. 5 and 7.

FIGS. 6 and 7 show the bulb 5 and the capillary 6 assembled together. The counterpart 15 is screwed into the connection geometry 10. Pin 20 has pushed the closing member 9 into the chamber 7 of the bulb 5. Pin 20 has a length corresponding approximately to a length of opening 8 to make sure that closing member 9 can completely be pushed out of opening 8. Pin 20 is thinner than opening 8 so that a ring shaped connection between chamber 7 and groove 22 remains.

In an alternative possibility which is not shown the opening zone can be designed in another way without prefabricated opening 8 and closing member 9. In this alternative embodiment the opening zone can be penetrated by pin 20 which can, for example, have a sharpened tip. In order to facilitate the penetration of the opening zone by the pin 20 the opening zone can have a somewhat thinner thickness of the wall of the casing A metallic seal 24 is located between the front face 21 of the counterpart 15 and a bottom 25 (FIG. 3) of the connecting geometry 10. This metallic seal, for example a copper ring, prevents escape of the filling to the environment.

The ring seal 19 is slightly compressed between section 18 of the counterpart and section 13 of the connecting geometry. This ring seal 19 has two functions: a first function is to form a seal during assembly of the capillary 6 to the bulb 5. During assembly pin 20 pushes closing member 9 out of opening 8 into chamber 7. In this case there is a short moment in which opening 8 is open and metallic seal 24 does not seal. However, the ring seal 19 prevents that the filling out of chamber 7 escapes to the environment.

The second function of ring seal 19 is to prevent that moisture or other environmental disturbances reach the metallic seal 24 after mounting. In this way corrosion of the metallic seal 24 can be prevented.

The opening 8 is positioned centrally with respect to the connecting geometry 10. The pin 20 is arranged centrally with respect to the counterpart 15. Therefore, pin 20 is centered with respect to opening 8 and is therefore able to push closing member 9 out of opening 8 into chamber 7.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A bulb for a thermostatic expansion valve, said bulb comprising a chamber, said chamber being located within a metallic casing of said bulb and being filled with a filling, adapted to influence a valve element of said thermostatic expansion valve, wherein said bulb comprises a connection geometry adapted to be connected to a capillary member and said metallic casing being provided with a closed opening zone located within said connection geometry, said closed opening zone being adapted to be opened upon mounting a counterpart to said connection geometry, such that during the connection of said bulb and said capillary member, said closed opening zone is opened to establish a connection between said chamber and said capillary member.

2. The bulb according to claim 1, wherein said closed opening zone comprises an opening closed by a closing member held in said opening.

3. The bulb according to claim 1, wherein an opening has an area adapted to a size of a closing member allowing said closing member to be pushed into said chamber.

4. The bulb according to claim 1, wherein an opening is positioned centrally with respect to said connection geometry.

5. The bulb according to claim 1, wherein said closed opening zone is adapted to be perforated by a part of said counterpart.

6. A set comprising said bulb according to claim 1 and at least part of the thermostatic expansion valve connected to said capillary member, said capillary member having at one end said counterpart.

7. The set according to claim 6, wherein said counterpart comprises a pin at a front face, said pin being adapted to be pushed into said closed opening zone to produce an opening.

8. The set according to claim 7, wherein said pin has a cross section smaller than said area of said opening.

9. The set according to claim 7, wherein said counterpart comprises a groove in said front face surrounding said pin and a channel connected to said groove.

10. The set according to claim 6, wherein a metallic seal is arranged between a front face of said counterpart and said bulb.

11. The set according to claim 6, wherein a ring seal is located on a circumferential face of said counterpart, said ring seal sealing against said connection geometry.

12. The bulb according to claim 2, wherein said opening has an area adapted to a size of said closing member allowing said closing member to be pushed into said chamber.

13. The bulb according to claim 2, wherein said opening is positioned centrally with respect to said connection geometry.

14. The bulb according to claim 3, wherein said opening is positioned centrally with respect to said connection geometry.

15. A set comprising said bulb according to claim 2 and at least part of said thermostatic expansion valve connected to said capillary member, said capillary member having at one end said counterpart.

16. A set comprising said bulb according to claim 3 and at least part of said thermostatic expansion valve connected to said capillary member, said capillary member having at one end said counterpart.

17. The bulb according to claim 2, wherein said opening is closed by said closing member held in said opening by a press-fit.

18. A method for connecting a bulb and a capillary of a thermostatic expansion valve, wherein the following steps:
   selecting said bulb, said bulb having a chamber, said chamber being located within a metallic casing of said bulb and being filled with a filling adapted to influence a valve element of said thermostatic expansion valve, said bulb comprising a connection geometry, said metallic casing comprising a closed opening zone within said connection geometry,
   in a connecting step connecting said connection geometry to a counterpart arranged at an end of said capillary, and
   opening said closed opening zone during the connection of said bulb and said capillary member to establish a connection between said chamber and said capillary member.

19. The method according to claim 18, wherein said counterpart is connected to said connecting geometry by screwing.

20. The method according to claim 18, wherein a sealing is established by inserting said counterpart into said connecting geometry.

21. The method according to claim 18, wherein a metallic seal is positioned between a front face of said counterpart and said connecting geometry.

* * * * *